United States Patent
Glasheen

[11] Patent Number: 5,197,337
[45] Date of Patent: Mar. 30, 1993

[54] LOW FORCE FLOWMETER PICK-OFF

[75] Inventor: William M. Glasheen, Derry, N.H.

[73] Assignee: Ametek, Wilmington, Mass.

[21] Appl. No.: 679,953

[22] Filed: Apr. 3, 1991

[51] Int. Cl.[5] .................. G01F 15/06; G01P 3/487
[52] U.S. Cl. ........................... 73/861.78; 324/174
[58] Field of Search ........... 73/861.35, 861.77, 861.79;
324/174, 207.15, 207.25; 336/110; 123/414

[56] References Cited

U.S. PATENT DOCUMENTS

| | | | |
|---|---|---|---|
| 1,967,017 | 7/1934 | Bohner | 73/861.75 |
| 3,671,810 | 6/1972 | Barnes et al. | 336/110 |
| 4,056,976 | 11/1977 | Hildebrand et al. | 73/861.35 |
| 4,301,686 | 11/1981 | Allen, Jr. | 73/861.35 |
| 4,901,697 | 2/1990 | Schleupen | 123/414 |

FOREIGN PATENT DOCUMENTS 0374696 12/1989 European Pat. Off. .
2183847A 12/1985 United Kingdom .

Primary Examiner—Herbert Goldstein
Assistant Examiner—R. L. Biegel
Attorney, Agent, or Firm—Amster, Rothstein & Ebenstein

[57] ABSTRACT

A low torque magnetic pick-off assembly has both a stationary magnet and a magnet mounted on a rotating member. The stationary magnet is oriented parallel to the axis of the rotating member and is used to establish a magnetic field in a field guide passing through a coil. The magnet on the rotating member modulates the magnetic field passing through the coil thereby inducing an output voltage in the coil. The output voltages indicates the passage of the magnet on the rotating member past the stationary magnet.

6 Claims, 3 Drawing Sheets

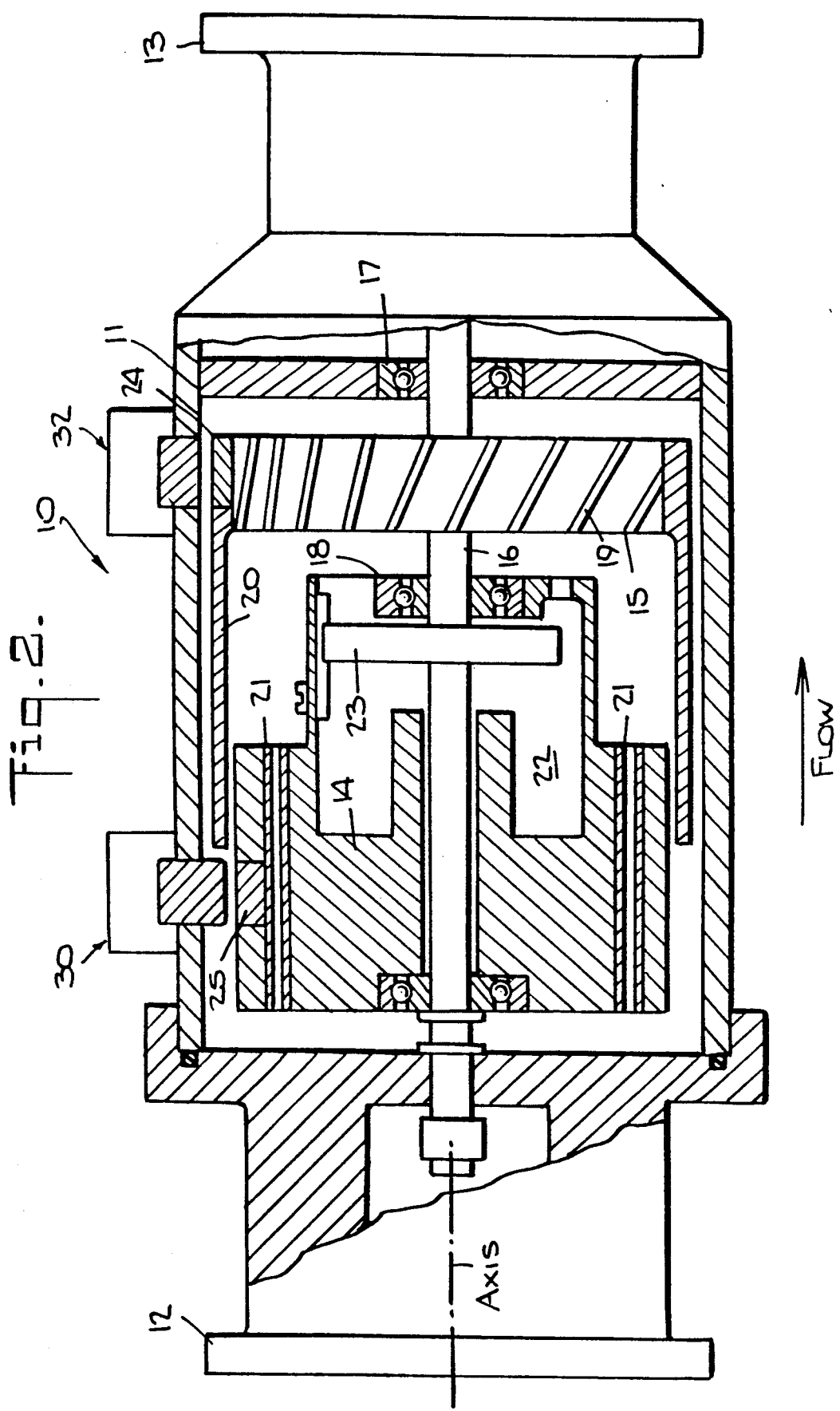

LONGITUDINAL AXIS

LOW FORCE FLOWMETER PICK-OFF

BACKGROUND OF THE INVENTION

1. Field of Invention

This invention relates to a low torque magnetic pick-off particularly useful in an angular momentum mass flowmeter. More specifically, it relates to an angular momentum mass flowmeter utilizing magnetic pick-offs that use specially oriented magnets on both the rotating and stationary portion of the flowmeter to generate accurately timed electrical pulses that are indicative of the angular position of the rotating elements.

2. Description of Related Art

One well known form of angular momentum mass flowmeters utilize magnets positioned on the turbine and/or the swirl generating impeller elements of the flowmeter. Reference is made to U.S. Pat. No. 3,043,141, for an illustration of such a flowmeter arrangement. In flowmeters of this type, mass flow is measured by measuring the time interval necessary for the rotating elements (the turbine and impeller to move through a relative displacement (phase) angle A. The displacement angle A is a function of the fluid torque exerted on the turbine element by the angular momentum of the fluid being measured. Sensor are mounted on the housing of the flowmeter to produce an output voltage whenever the magnets on the rotating elements pass near the sensors.

One disadvantage of the magnet and winding pick-offs flowmeters as shown in U.S. Pat. No. 3,043,141 is that they perform poorly at low flow ranges. This is because generally the attraction forces between the magnet and ferromagnetic components of the sensors (pick off coils) preclude the rotating assembly from rotating at low flow conditions. This can prevent start-up at low flows with high viscosity fluids (i.e., cold fuel). In effect, the start-up torque required to overcome the magnetic forces involved in generating the electrical signals and overcoming magnetic eddy and leakage losses reduce the accuracy and measuring range of the flowmeter.

Attempts have been made to overcome this problem. For example, FIG. 1 illustrates a prior art pick-off for a flowmeter including a field guide 2 encircling coil 3 mounted within housing 4. Magnets 5 and 6 are mounted on rotating member 7. The magnets 5 and 6 are mounted so that their respective south and north poles pass under the gap in field guide 2. The alternating magnetic field thus created is coupled by field guide 2 through coil 3. Coil 3 in turn creates an output voltage every time the pair of magnets 5 and 6 alters the magnetic field passing through it via guide 2. A major limitation of this configuration is the tendency for the magnets 5 and 6 to exert attraction forces to field guide 2 thereby impeding the motion of rotating member 7. This impediment to rotating motion of rotating member negatively influences the measurement accuracy of the flowmeter as well as its ability to perform measurements at low flow rates.

Applicant has found that by changing the configuration and orientation of the magnets and pick-off coils as compared to the prior art, the magnetic attraction forces responsible for limiting flowmeter performance can be reduced significantly. This finding extends the measuring range at low flow rates of the flowmeter as well as increasing its accuracy.

It is therefore a principal objective of the invention to provide a flowmeter having a low torque requirement imposed by the pick-off coils and associated magnetic elements over the operating range of the meter.

It is another objective of the invention to provide a low torque pick off for measuring angular displacement between moving elements internal to a flowmeter having minimal start-up torque.

It is yet another objective of the invention to provide a means for measuring the rotating velocity of internal rotating elements requiring minimal amounts of energy thereby reducing the interference with the rotating elements.

Further objectives and advantages of the invention will become readily apparent as the description thereof proceeds.

SUMMARY OF THE INVENTION

In general, the various objectives and advantages of the invention are typically realized in a low torque pick off assembly (or sensor) in which a magnetic assembly is positioned proximate to the outer periphery of a rotating member. The magnetic assembly has a north and south pole oriented radially with respect to the axis of the rotating number. A sensor mounted on the housing includes a stationary magnet located to interact with the magnetic field produced by the rotating magnetic assembly. This stationary magnet has its north and south poles oriented generally parallel to the axis of the housing. A coil having a central opening and one or more turns of a conductor material is provided along with a magnetic field guide magnetically coupling the magnetic field of the stationary magnet with the coil. In this configuration, the passage of the magnetic assembly rotating past the sensor induces voltage in the coil indicative of the passage of said rotating magnetic assembly.

This pick-off assembly can be advantageously used in an angular momentum mass flowmeter having rotating components joined by a torque resistant element, such as a spring. The phase angle established between the rotating components as a result of the angular momentum imparted by the flowing mass is proportional to the mass flow rate. This phase anqle is measured by one or more low torque pick-off assemblies which sense the passage of one or more rotating magnetic assemblies located on the outer periphery of the rotating components with respect to the one or more sensors mounted on the flowmeter housing. The rotating magnets interact with stationary magnets forming part of the sensors to generally balance out the interacting magnetic forces as well as induce a voltage in a coil associated with the sensor to signal their passage.

In accordance with the invention, a mass rate flowmeter comprises a flowmeter housing for receiving a stream of fluid whose mass flow rate is to be measured. The flowmeter housing has an inner surface and, for reference purposes, a longitudinal axis extending through the center of the housing. The longitudinal axis is generally aligned with the direction of the flow of the fluid through the housing.

Internal to the housing are angularly restrained rotating elements, typically a spring connected turbine and an impeller. These rotating elements are coaxially mounted within the housing. These rotating elements are subject to relative angular displacement around the longitudinal axis in response to the mass rate of flow of the fluid through the housing.

A low torque pick off assembly includes a magnetic assembly mounted on the rotating elements and a stationary sensor mounted on the housing which interact to generate a signal to signify the passage of one rotating element past a point on the stationary housing. The rotating magnetic assembly has a north pole and a south pole and is mounted on the outer periphery of the rotating elements. The poles of the rotating magnetic assembly are oriented so that its south and north magnetic poles are oriented radially, perpendicularly to the longitudinal axis of the housing. In other words, one of the magnetic poles is located radially further away from the longitudinal axis of the housing as compared to the other pole.

The rotating magnetic assembly interacts with the stationary sensor mounted on the housing for providing an output signifying the passage of the rotating magnetic assembly past the stationary sensor. The stationary sensor includes a magnet, a coil and a magnetic field guide. The stationary magnet has a north pole and a south pole, and is located on the inner surface of the housing. In contrast to the rotating magnetic assembly, the poles of the stationary magnet are oriented so that its south and north poles are aligned parallel with the longitudinal axis of the housing. The coil is made of one or more turns of a conductive material, such as copper wire, wound so as to define a central opening in the coil. The magnetic field guide magnetically couples the north pole and the south pole of the stationary magnet while it also passes through the central opening in the coil thereby couples the magnetic field produced by the stationary magnet to the coil.

In this configuration, the passage of the rotating magnetic assembly past the stationary sensor modulates the magnetic flux created by the stationary magnet in the field guide and thereby induces a voltage in the coil. This induced voltage identifies the time of passage of the rotating magnetic assembly past the stationary sensor. Furthermore, the interaction between the rotating and stationary magnets cancels the net magnetic forces opposing the motion of the rotating elements.

The magnetic field guide is made of a magnetically permeable material to reduce leakage of the magnetic field produced by the stationary magnet. Such a magnetically permeable material is mu metal. A gap is interposed between the stationary magnet and the magnetic field guide can be configured to control the amount of magnetic flux passing through the coil. The gap also allows the magnetic flux to be modulated by the passage of the rotating magnets.

BRIEF DESCRIPTION OF THE DRAWINGS

FIG. 2 is a partially broken away view of an angular momentum mass flowmeter incorporating the low torque pick-off assembly of the present invention;

DESCRIPTION OF THE PREFERRED EMBODIMENT

Figure 1:
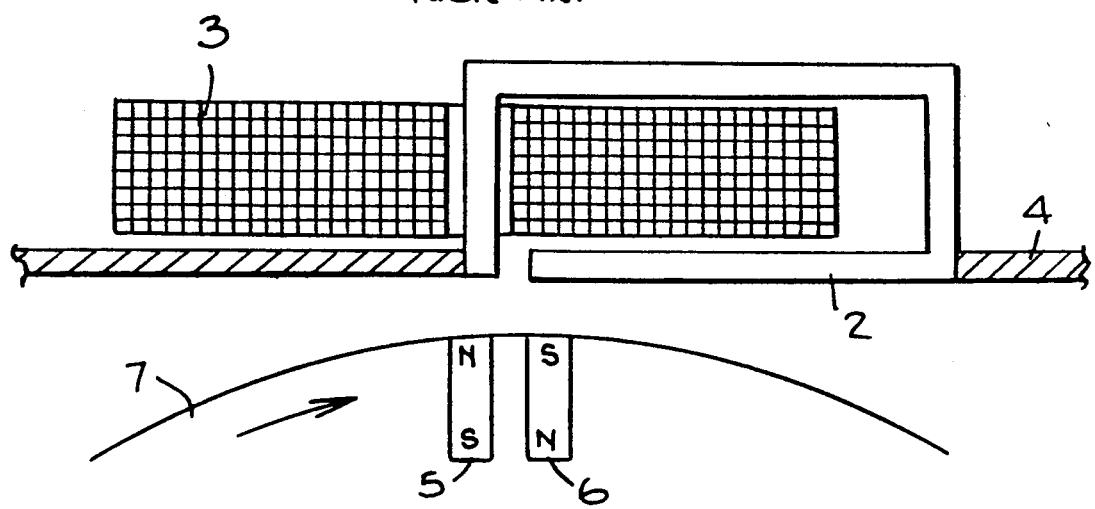
FIG. 1 illustrates a prior art pick-off for a flowmeter showing a conventional arrangement of a field guide, coil and rotating magnets.

FIG. 2 is an exemplary illustration of a flowmeter utilizing the present invention. The flowmeter of FIG. 2 is shown generally at 10 and shows a housing 11 (partially broken away) having inlet and outlet ends 12 and 13. A turbine 14 and an impeller 15 in housing 11 are mounted on shaft 16 which is journaled at both ends on suitable ball bearings 18 with only the ball bearings 18 on the downstream end shown in FIG. 2.

The turbine 14 and swirl generating impeller element 15 are coupled by a torque resistant element, spring 23. An angular displacement occurs between the turbine 14 and impeller 15 in response to angular momentum imparted by the fluid to the impeller which is proportional to the mass flow rate of the fluid stream.

Turbine 14 is journaled on shaft 16 by means of ball bearings 18. Swirl generating impeller 15, on the other hand, is secured directly to shaft 16. Impeller 15 consists of a main body portion having a plurality of skewed vanes 19. The impact of the fluid on the vanes imparts an angular velocity to the fluid and to the impeller. Since impeller 15 is secured directly to shaft 16, rotation of the impeller causes the shaft to rotate at some angular velocity governed by the mass flow rate of the fluid. A cylindrical shroud 20 extends from the periphery of impeller and is concentric with, and surrounds, turbine 14. Thrust bearings, not shown, space the turbine and impeller/swirler along the shaft and are located between the turbine and the impeller and on the outside of the turbine and impeller.

A plurality of fluid passages in the form of tubes 21 extend through and are distributed around the periphery of turbine 14. A portion 22 on the downstreams side of the turbine 14 has on one end a helical spring 23 (calibrated torque resistant element) secured to the inner wall of the portion 22 with the other end of the spring being secured to shaft 16. In effect, impeller 15 and turbine 14 constitute two independently rotating elements joined by a (calibrated) restraining spring 23. Thus, while the two elements rotate at the same rate, the fluid torque acting on the turbine, will cause the turbine to be displaced with respect to the impeller by an angle A which is a linear function of the mass rate of flow. Readout of the relative phase angle A between the turbine and impeller is representative of the mass rate of flow and is achieved by measuring the time difference in the passage of rotating magnets 24 and 25 with respect to their respective low torque pick off assemblies 32, and 30, respectively.

The flow of the liquid as it passes through the turbine has a change of angular momentum which is equal to the fluid torque acting on the turbine and is given by:

$$t_T = WMr^2 \qquad 1$$

$t_T$ = fluid torque acting on the turbine
W = angular velocity of turbine shaft
M = mass flow rate
r = average radius of gyration of turbine flow passages The torque applied by fluid on turbine 14 acts to deflect the restraining spring 23 relative to shaft 16. The spring 23 deflects through some angle A such that the spring torque equals the fluid torque. This spring torque is given by:

$$t_s = KA \qquad (2)$$

Where:
$t_s$ = Spring torque
$K$ = Spring constant
$A$ = Angle of the deflection of the turbine relative to the shaft.

The balance of torques on the turbine leads to equating the spring torque (eq. 2) to the fluid torque acting on the turbine (eq. 1)

$$t_s = t_T \qquad (3)$$

Now, Substituting Equation 1 and 2 into 3, and solving for A yields:

$$A = \frac{wMr^2}{K} \qquad (4)$$

Thus, for a given geometry, the angle of deflection (phase difference) of the turbine 14 relative to the impeller 15, (A), is a function of both turbine speed and mass flow rate. Rather then measuring the angular displacement phase difference constrained by the spring 23 directly, the two magnetic pick-offs 30, 32 measure the time difference between reference points on the turbine 14 and impeller 15, as represented by magnets 24 and 25, to move through the displacement angle A between the turbine 14 and the impeller 15. Angle A can be determined by measuring the elapsed time between the signal represented by a passage of magnet on impeller 15 and the signal produced by the passage of the magnet on turbine 14. Thus:

$$A = w\, dT \qquad (5)$$

Where:
$w$ = turbine and shaft angular velocity
$dT$ = elapsed time interval, delta A, between pulses from magnetic pick-offs Combining Equation (4) and (5), and solving for M yields:

$$M = \frac{KdT}{r^2} = K'dt \qquad (6)$$

Where $$K' = \frac{K}{r^2}$$

M, the mass flow rate through the flowmeter is then directly proportional to the time difference between the (delayed) impeller pulse and the turbine pulse. The flowmeter scale factor K' is a function of the fixed geometry of flowmeter and the physical characteristic of the restraining spring. Since the scale factor is constant through all operating conditions of the flowmeter, and from one flowmeter to another, the time differential dT thus becomes an accurate measure of the mass flow through the turbine. The angular velocity w can also be determined by counting the number of coil induced pulses per unit time. Thus w, the shaft angular velocity, its obtained from one or both of the pick off coils during the calibration cycle of the flowmeter.

Figure 3:
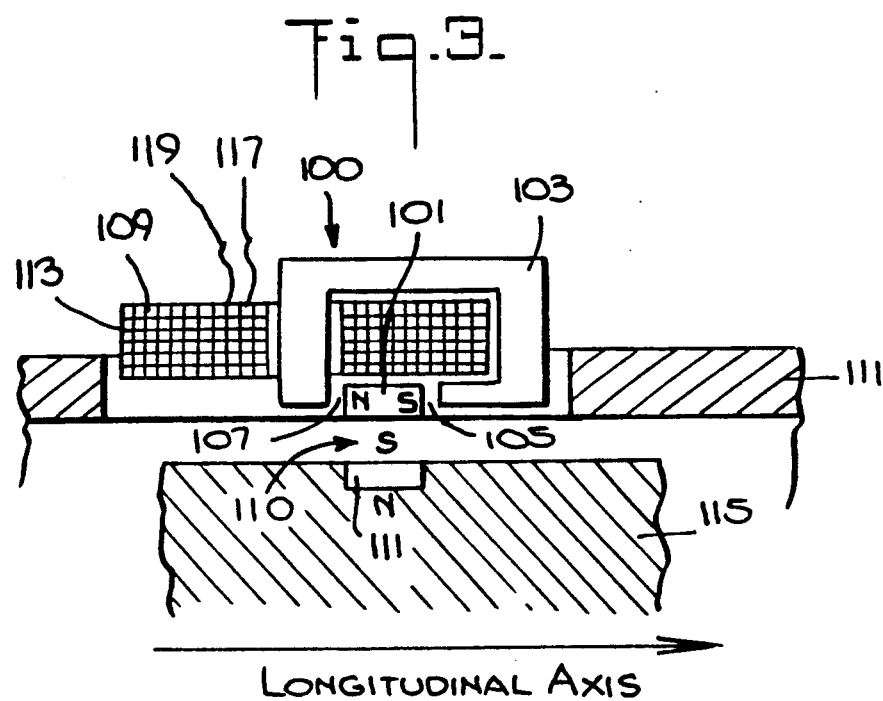
FIG. 3 is a side view of the low torque pick-off assembly in accordance with this invention showing the configuration of the coil and stationary and rotating magnets.

FIG. 3 illustrates the details of the two identical low torque pick-off assemblies 30 and 32 shown in FIG. 1, Each assembly includes a sensor 100 and a rotating member 115. Sensor 100 includes stationary magnet 101 having two magnetic poles, a north pole N and a south pole S. The two magnetic poles are aligned with the longitudinal axis of the housing, the north pole being to the left of the south pole. Stationary magnet 101 creates a magnetic flux through field guide 103 through gaps 105 and 107. Field guide 103 is made of magnetically permeable material such as brand name "mu-metal" manufactured by Carpenter Steel. Field guide 103 couples the magnetic field of stationary magnet 101 to coil 109 which is made up of one or more turns of a conductor, such as copper. Each conductor turn 113, the aggregate of which form coil 109, forms an internal opening through which field guide 103 passes. Rotating magnet 111 on the rotating member 115, modulates the magnetic flux induced by stationary magnet 101 in the air gaps 105 and 107 and field guide 103. This modulation is created by magnet 111 as it passes by magnet 101 during every revolution of rotating member 115. Rotating member 115 in FIG. 3 and 4 can be any moving part internal to the flowmeter such as impeller 15 and turbine 14 as shown in FIG. 2.

The changes in magnetic flux induced by the modulation of the magnetic field in field guide 103 are converted by coil 109 into electrical voltage fluctuations by the well known process of magnetic induction. The output voltage induced by the modulated magnetic field in coil 109 appears on leads 119 and 117, corresponding to the beginning and end of the continuous conductor wound to create coil 109 and each individual turn 113.

By comparing the time difference at which the output voltage appears at the leads 119 and 117, in each of two separate pickoffs 30, 32, the value of time interval dT as specified in equation (5) can be measured. This interval can be directly related to the mass flow rate through the meter as outlined by equations 1 through 6.

Figure 4:
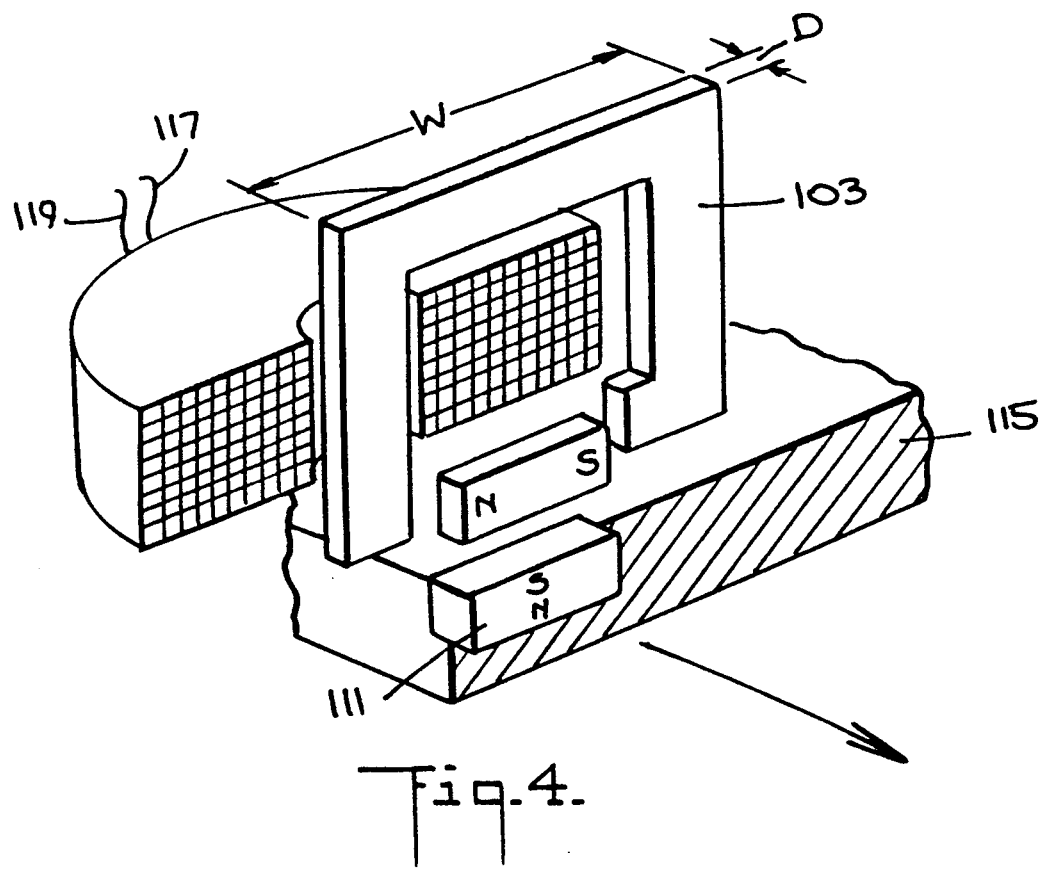
FIG. 4 is a perspective view of FIG. 3 showing the relationship between the coil, and the stationary and rotating magnets.

FIG. 4 shows a perspective view of the pick off coil and rotating magnets shown in FIG. 3 and shows the added detail of the relative thickness of the field guide 103 and its position with respect to the coil 109. In practice, the assembly of coil 109, stationary magnet 101, and field guide 103 are encapsulated in a convenient plastic resin and threaded into housing 11. The plastic encapsulating material has to be compatible with the fluids and temperatures where the flowmeter will be used.

In an actual embodiment of the invention, an exemplary dimension for the thickness D of the field guide 103 is 0.050 inches, while the W dimension is 0.20 inches. The coil is made up of 4000 turns of 36 gauge (0.0005 inch diameter) enameled copper wire. The coil is 0.25 inches high, 1.30 inches in diameter with a central opening sufficient to allow passage of the field guide 103. The stationary magnet 101 has the same cross section as the field guide 103 and is 0.30 inches long. The clearance between stationary magnet 101 and rotating magnet 111 ranges from 0.070 to 0.120 inches. The rotating magnet 111 is also 0.30 inches long and has a 0.10 inch square cross section. Both the rotating and stationary magnets are made of Samarium Cobalt type magnetic material having an energy product of 16,000,000 gauss oersted (minimum) manufactured by Permag East.

Figure 5:
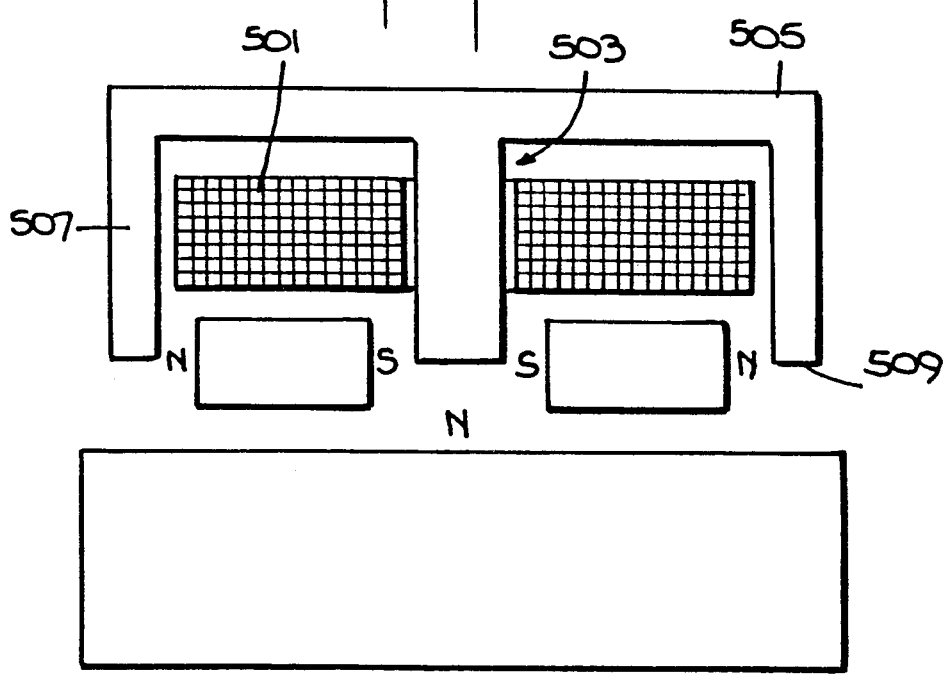
FIG. 5 shows another embodiment of the present invention where the electric coil is wound around on "E" shaped core and the presence or absence of the moving magnet influences the level of flux through the center leg of the "E" core.

In yet another physical embodiment as shown in FIG. 5 of the present invention, a coil 501 of 4000 turns of #30 wire yields 30 mV to 400 mV from about 3 inches/sec to 20 inches/sec speed of the exterior magnet along an axis perpendicular to the page.

The electric coil is not encapsulated per se. It is wrapped around a plastic bobbin made of G-10 material which is a blend of thermoset plastic and fiberglass. Both adhesives used in the bobbin construction and the material used as wire insulator are polymide or Kapton.

In FIG. 5, the electric coil 501 axis is around the center leg 503 in the "E" shaped field guide 505. The magnetic field levels in this leg 503 change from about 8600 gauss without the exterior, moving magnet present, to about 1300 gauss when the moving magnet is present. Note that the magnetic field in the outside legs 507 and 509 changes from 8600 to 11400 gauss. The magnetic field change in the center leg 503 generates the coil's electrical signal.

While the instant invention has been described in connection with a preferred embodiment thereof, the invention itself is by no means limited thereto since many modifications in the instrumentalities employed and structures utilized may be made without departing from the true scope and spirit of the invention which is set forth in the appended claims.

What is claimed is:

1. A pick-off assembly for sensing the passage of a rotating member relative to a stationary housing comprising:
   a) a magnetic assembly positioned on the rotating member proximate to the outer periphery of said rotating member, said magnetic assembly having a north and south pole oriented radially with respect to the axis of said rotating member;
   b) a stationary sensor mounted on said housing including a stationary magnet located to interact with the magnetic field produced by said rotating magnetic assembly, said magnet having its north and south poles oriented generally parallel to the axis of said rotating member, a coil having a central opening and one or more turns of a conductor material and a magnetic field guide magnetically coupling the magnetic field of said stationary magnet with said coil, whereby the passage of said magnetic assembly proximate to said sensor induces a voltage in said coil indicative of the passage of said rotating magnetic assembly.

2. A pick-off assembly for sensing the passage of a rotating member relative to a stationary housing of claim 1 wherein a gap is interposed between said stationary magnet and said magnetic field guide.

3. A pick-off assembly for sensing the passage of a rotating member relative to a stationary housing of claim 1 wherein said magnetic field guide is made of a magnetically permeable material.

4. A mass rate flowmeter comprising in combination:
   a) a flowmeter housing for receiving a stream of fluid whose mass flow rate is to be measured, said flowmeter housing having an inner surface and a longitudinal axis, said longitudinal axis generally aligned with the direction of said stream of fluid through said housing;
   b) a pair of coaxially mounted rotating elements, said rotating elements being subject to angular displacement relative to said longitudinal axis in response to the mass rate of flow of fluid through said housing;
   c) a pair of pickoff assemblies for measuring the angular displacement between said rotating elements, each pickoff assembly including magnet means positioned on each of said rotating elements proximate to the outer periphery of said element and having a south pole and a north pole oriented with said south and north poles perpendicular to said longitudinal axis and a stationary sensor mounted on said housing including
      1) a stationary magnet located proximate to said inner surface of said housing, having a north pole and a south pole generally aligned parallel to said longitudinal axis and positioned to interact with said rotating elements of said pickoff assembly;
      2) a coil having a central opening and one or more turns of a conductive material;
      3) a magnetic field guide magnetically coupling the magnetic field of said stationary magnet to said coil wherein the passage of said magnet means past said stationary sensor in each of said pickoff assemblies induces a voltage in each of said coils from which the mass flow rate of fluid flow through said flowmeter can be determined.

5. The mass rate flowmeter defined in claim 4, wherein a gap is interposed between said stationary magnet and said magnetic field guide.

6. The mass rate flowmeter defined in claim 4, wherein said magnetic field guide is made of a magnetically permeable material.

* * * * *